INVENTORS
Erwin B. Byam and
Anthony K. Undraitis
BY Spencer Rockwell Bartholow
ATTORNEYS

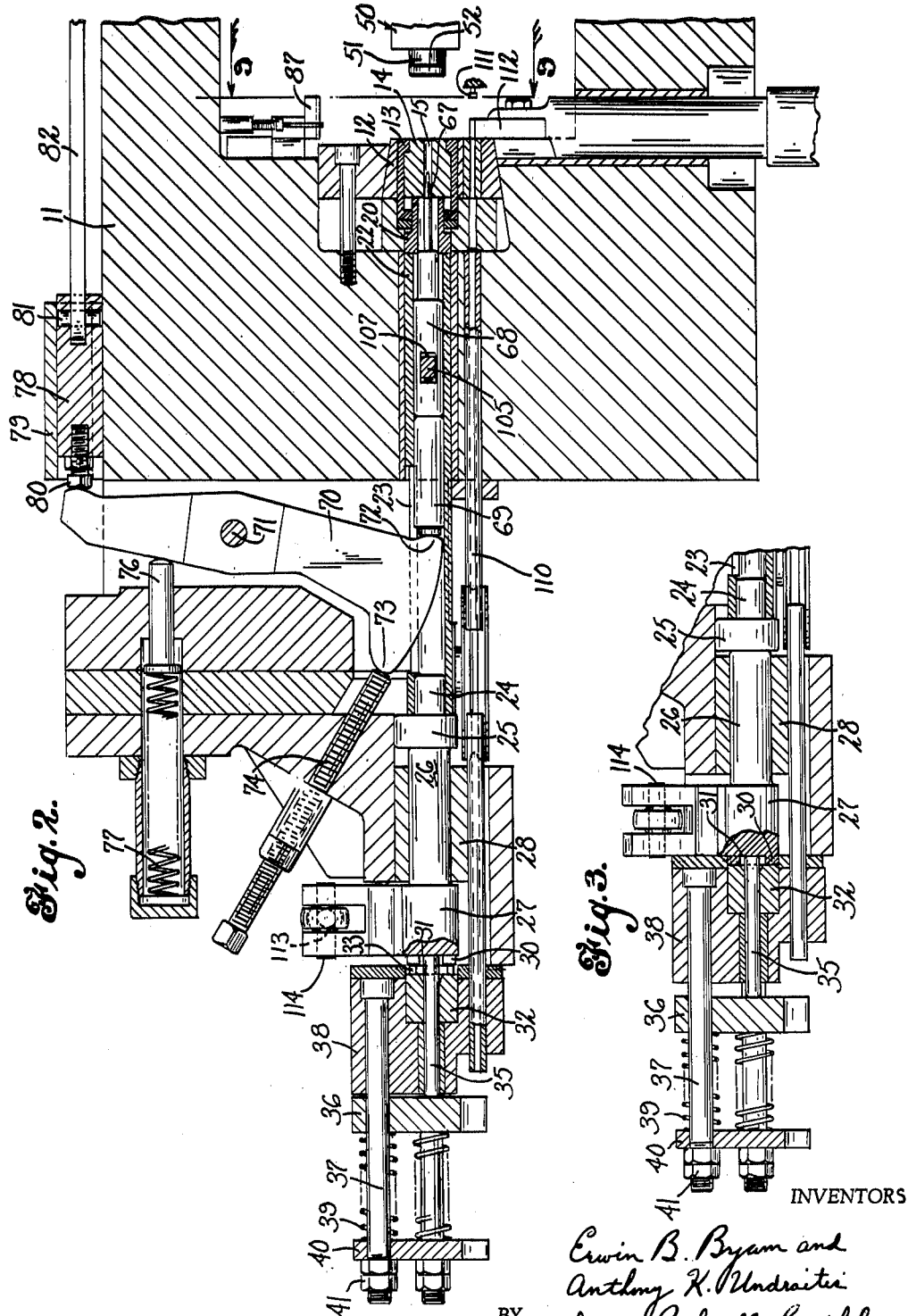

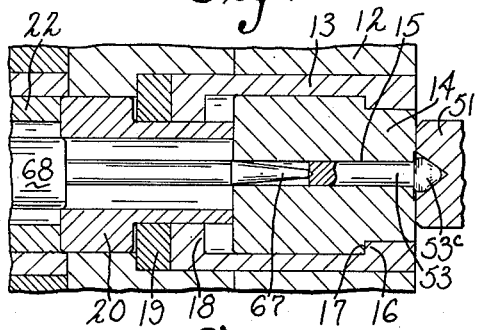
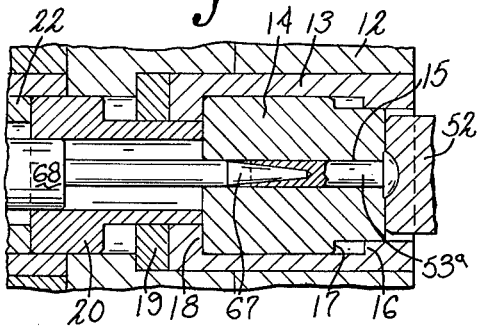
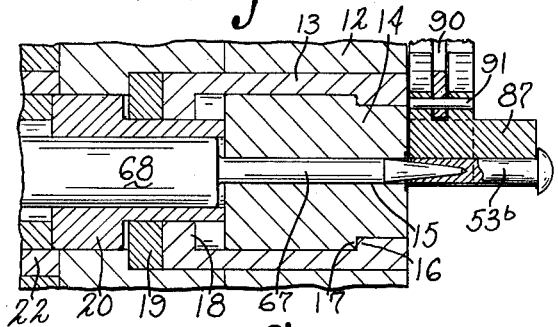
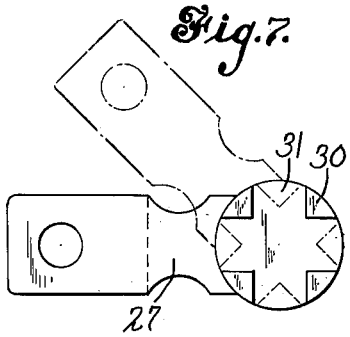
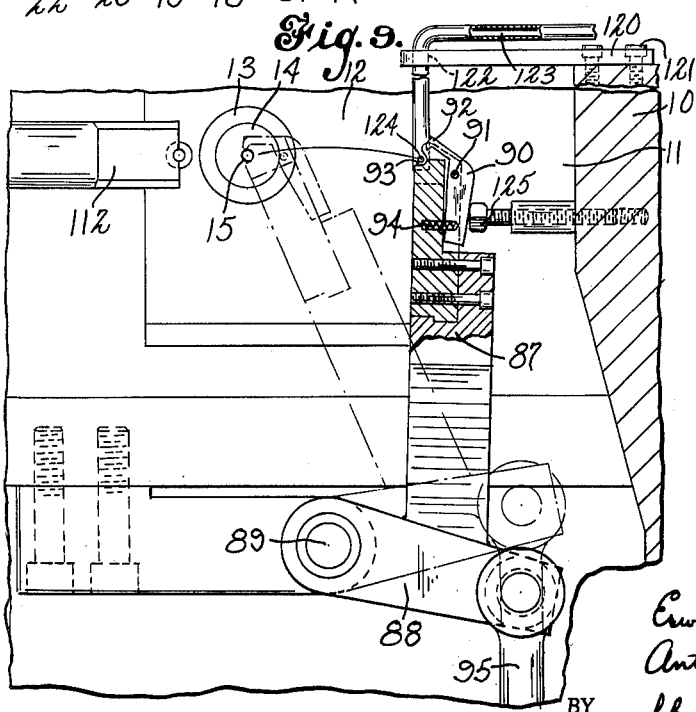
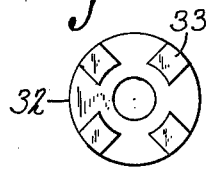

United States Patent Office 3,200,423
Patented Aug. 17, 1965

3,200,423
SINGLE-DIE DOUBLE-STROKE TUBULAR HEADERS
Erwin B. Byam, Wolcott, and Anthony K. Undraitis, Waterbury, Conn., assignors to Textron Inc., Providence, R.I., a corporation of Rhode Island
Filed Jan. 27, 1961, Ser. No. 85,251
16 Claims. (Cl. 10—12.5)

This invention relates to a single-die, double-stroke tubular header and a process of making such articles as headed hollow rivets although it will be understood that the process and apparatus may be employed in the manufacture of other parts of a shape similar to such rivets.

As illustrated in the application, the apparatus comprises a single die movably mounted in a die bed and a reciprocable gate mounted on the base of the apparatus for movement toward and from the die, which gate carries two punches cooperating alternately with the die upon alternate strokes of the gate or ram. Means are provided upon the gate to shift the punches from operative to inoperative positions alternately so that first one and then the other will cooperate with the single die, this means being actuated in timed relation to the reciprocation of the gate.

It may be noted that the apparatus employs only one die. Hence no transfer means is required to transfer the work from one station to the next. The workpiece or blank is cut from a length of solid stock such as a wire or rod by a severing tool and carried by this tool to a position opposite the die. It is also noted that the die is movably mounted in the die bed so that the workpiece and die may be moved relatively to a piercing pin to pierce the body of the rivet or workpiece and thereafter the piercing pin is moved forwardly to eject the work from the die.

Means are provided to positively hold the die against rearward movement during a part of the heading operation and thereafter to permit movement of the die rearwardly with respect to the piercing pin during the extruding or piercing operation and then again hold the die firmly against movement during the completion of the heading operation.

One object of the present invention is to provide a process and apparatus for making headed tubular rivets whereby the necessary operations may be performed in a single die by a plurality of punches which effect extrusion of the metal of the workpiece over a piercing pin to form the hollow portion of the finished article.

A further object of the invention is to provide an apparatus of the character described wherein the single die within which the work is contained is movable relatively to the die bed and to a piercing pin adapted to pierce the blank and means for holding the die positively and firmly against movement during certain steps of the process and at other times permitting movement of the die with respect to the piercing pin.

Still another object of the invention is to provide an apparatus of the character described wherein the piercing pin will be positively held against movement during the heading operations and permitted to move freely rearwardly between the heading operations, the means for controlling the position of the die being actuated in timed relation to the movement of the gate.

To these and other ends the invention consists in the novel features and combinations of parts to be hereinafter described and claimed.

In the accompanying drawings:

FIG. 2 is a horizontal sectional view on line 2—2 of FIG. 1;

FIG. 3 is a detail view of the mechanism for controlling the position of the die, the parts being shown in the position occupied when the die has been moved rearwardly;

FIG. 4 is an enlarged vertical sectional view through the single die showing the position of the tools during the coning or partial heading of the workpiece;

FIG. 5 is a similar view showing the position of the tools during the second or last operation consisting of completing the head upon, and piercing the body of, the workpiece;

FIG. 6 is a view similar to FIGS. 4 and 5 but showing the position of the tools during the ejecting of the completed workpiece from the die and the stripping mechanism for stripping the workpiece from the piercing pin;

FIG. 7 is a detailed view of the movable lever for controlling the position of the die in the die bed;

FIG. 8 is a view of the face of the abutment which cooperates with the controlling member shown in FIG. 7; and FIG. 9 is an elevational view partly in section taken substantially on line 9—9 of FIG. 2 showing the mechanism for stripping the workpiece from the piercing punch.

Figure 1:
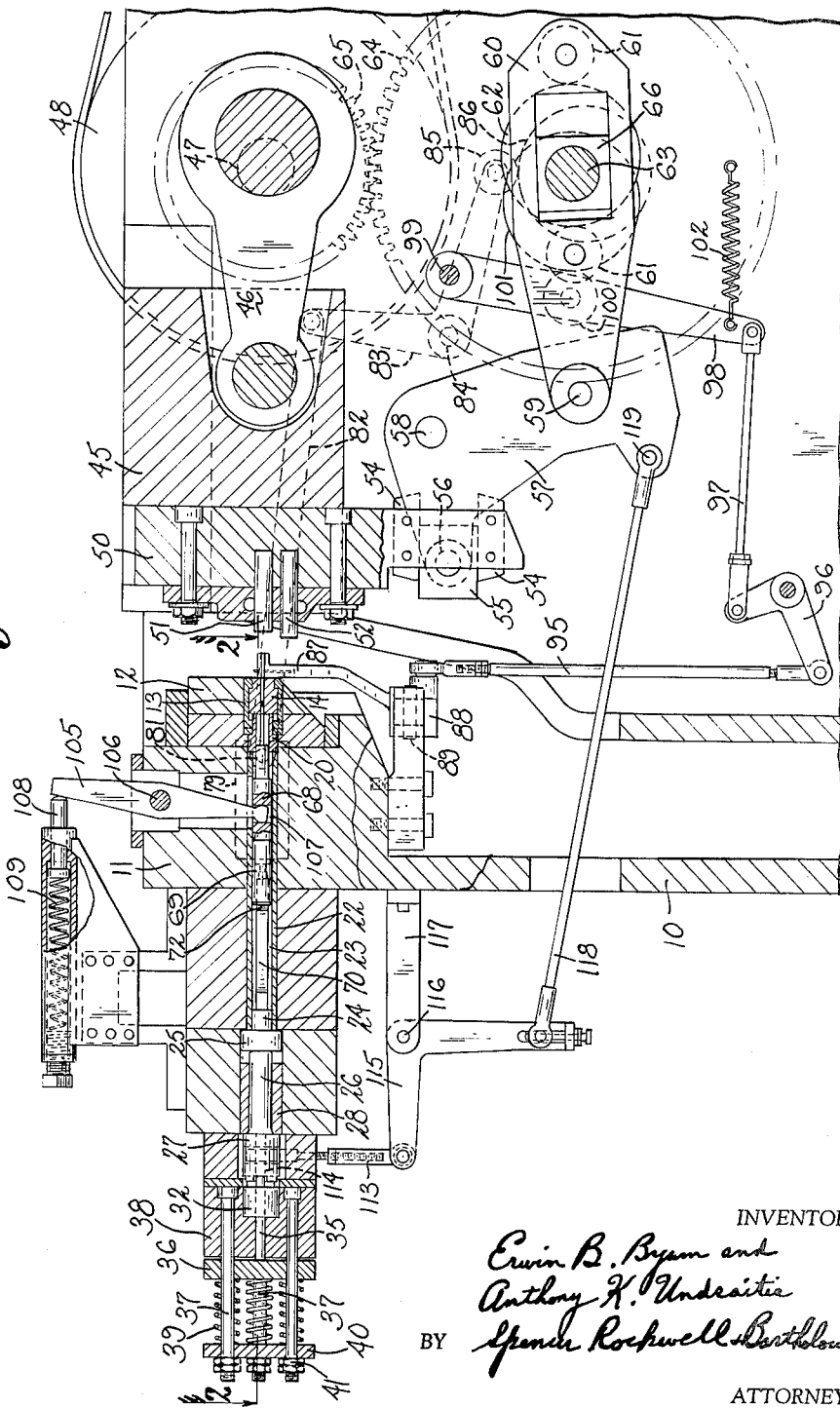
FIG. 1 is a vertical sectional view of a single-die, double-stroke header embodying our invention.

To illustrate one embodiment of the invention and a preferred apparatus for carrying out the improved process we have shown in the drawings a heading mechanism comprising a supporting structure 10 upon which is mounted a die bed 11. At the face of the die bed is mounted a die block 12 in which is secured (FIGS. 4, 5 and 6) a die holder 13 within which is movably mounted the working die 14 having a die opening 15 therein.

The die holder is shouldered, as shown at 16, and the die itself provided with a cooperating shoulder 17 to limit the movement of the die in a forward direction or in a direction toward the punch. The die holder 13 is provided adjacent its rear end with an inwardly directed flange 18 which serves as a stop for the movement of the die in the other direction. The rear face of the die holder may rest against a spacing collar 19 within the die block 12.

A shouldered sleeve member 20 is provided in the die block and the forward face of this member rests against the rear face of the die 14. Abutting against the rear face of the sleeve 20 is a long sleeve 22 which extends through the die bed and is provided with a longitudinally elongated opening 23 in its upper face, the function of which will be hereinafter described. Mounted in the rear end of this sleeve is a short pin or rod 24 having a head 25 against which (FIG. 1) impinges the elongated body portion 26 of the die-controlling member 27. It is understood that the member 27 together with its body portion 26 is mounted for rotation between two positions in a portion of the supporting structure and is embraced by a sleeve member 28 within which it rotates.

The member 27, as shown in FIG. 7, is provided upon its rear face with a plurality of projections on lands 30, between which lands are recesses 31. Cooperating with the controlling member 27 is a sleevelike plug 32 (FIGS. 2 and 3) also having a plurality of spaced projections 33 upon its forward face, the projections 30 and 33 being so spaced that they may lie opposite each other or, when the member 27 is rotated, the projections of one member will lie within the recesses between the projections on the other member. It will be seen, therefore, that when the projections lie opposite each other, the sleeve 22 will be held in its forward position and thus hold the die 14 in its forward position against the shoulder 16, as shown in FIG. 4, while when the member 27 has been rotated to the position shown in FIG. 3, the projections 33 will be received in the recesses 31 and permit the die to move rearwardly to the position shown in FIG. 5.

It will be understood that the die will be moved rearwardly by the pressure of the punch upon the work when the controlling member 27 is in the position shown in FIG. 3, and means are provided to return the die to its forward position. This means comprises a push pin 35 (FIGS. 2 and 3) extending through the plug 32, which pin bears at its forward end against the member 27 and at its rear end against a block 36 slidably supported upon rods 37 secured in a supporting member 38. Springs 39 surrounding the rods 37 act upon the member 36 and, therefore, urge the pin 35 in a forward direction against the member 27, thereby moving the sleeve 22 and the die forwardly. The springs 39 bear at their rear ends against an abutment 40 held upon the rods 37 by nuts 41.

Referring more particularly to FIG. 1, a gate 45 is slidably mounted upon the supporting bed of the machine, which gate is reciprocated by means of a pitman 46 mounted eccentrically upon a shaft 47 driven in any suitable way such as by the pulley 48, which in turn may be driven by any suitable source of power. Slidably mounted for vertical movement upon the gate 45 is a punch carrier 50 to which are fixedly secured punches 51 and 52 designed to cooperate upon alternate strokes of the gate with the die 14. As shown more especially in FIG. 4, the punch 51 forms a partial or cone head upon the workpiece 53 and indents this workpiece slightly against a piercing pin to be hereinafter described, while, as shown in FIG. 5, the punch 52 completes the heading of the blank and drives it and the die rearwardly against the piercing pin to extrude the metal of the blank rearwardly about the pin and form the hollow body.

The punch carrier, as previously described, is mounted to slide in the gate in a vertical direction and is shifted from one position to another upon alternate strokes of the gate. To this end spaced guide blocks 54 are provided on the carrier and slidably mounted between these blocks is a block 55 to which is pivoted at 56 one arm of a bell-crank lever 57 pivoted on the supporting bed at 58. To the other arm of this bell-crank lever is pivoted at 59 a slide 60 having spaced-apart cam follower rollers 61 thereon, these rollers being adapted to be engaged by a cam disk 62 mounted eccentrically upon a shaft 63, the shaft 63 being rotated by means of a gear 64 secured thereon, the teeth of which mesh with the gear 65 secured upon the shaft 47.

It will be seen, therefore, that upon rotation of the shaft 47 the gate will be reciprocated by the pitman 36 and, in timed relation therewith, the punch carrier 50 will also be reciprocated vertically by the bell-crank lever 57 to present first one punch and then the other to the die upon alternate strokes of the gate. The slide 60 may be guided by a block 66 mounted upon the shaft 63.

Referring particularly to FIGS. 2, 4, 5 and 6, a piercing pin 67 is mounted within the shouldered sleeve member 20 and extends forwardly so that its end extends within the die opening 15. The pin 67 may be of the type shown or may take the form of those normally used in the art for effecting the extrusion of tubular portions in the stock. This pin may be formed integrally with a rod 68 slidably mounted within the sleeve 22, and the rear end of this rod bears against a plug 69 also slidably mounted within the sleeve 22, the rear end of this plug extending rearwardly to a position below the opening 23 in the sleeve. A lever 70 pivoted to the supporting frame at 71 extends within the slot or opening 23 and the nose 72 of this lever engages the rear end of the plug 69. The lower end of the lever 70 is also provided with a second nose portion 73 which, when the piercing pin is in its rearward position, as shown in FIG. 2, abuts a stop screw 74 threadedly mounted in the supporting base. The position of the screw 74 determines the rearward limit of the position of the piercing pin and the screw may be adjusted for workpieces or blanks of different lengths. The upper portion of the lever 70 above its pivot 71 is engaged by a plunger 76 spring pressed forwardly by the spring 77, which spring normally urges the nose 73 into engagement with the stop screw 74.

It will be understood that the piercing pin not only serves to pierce the workpiece when the latter is forced inwardly and the metal thereof extruded into the clearance space between this pin and the wall of the die opening 15, but also serves to eject the work from the die. This pin is, therefore, propelled forwardly by means of a plunger 78 (FIG. 2) slidably mounted in a casing 79 mounted on the die bed, this plunger being provided with an adjusting bolt 80 which engages the upper end of the lever 70. The spring-pressed plunger 76 maintains the lever 70 against the head of the screw. Pivoted at 81 to the plunger 78 is one end of a link 82, the other end of which is pivoted to a bell-crank lever 83 (FIG. 1). The bell-crank lever is pivoted to the supporting base at 84, and at the end of its other arm carries a cam follower roller 85 adapted to engage a cam 86 eccentrically mounted on the shaft 63 heretofore referred to.

It will be seen, therefore, that the plunger 78 will move the nose 72 of the lever forwardly to advance the piercing pin 67 to eject the work from the die in timed relation to the movement of the gate. It may also be noted that the gears 64 and 65 are so dimensioned that the former makes one revolution for every two revolutions of the latter so that two strokes of the gate will be effected and, therefore, two operations performed upon the work before it is ejected from the die.

Referring particularly to FIGS. 1 and 9, a stripper member 87 is formed integrally with a lever 88 pivoted to the frame at 89 at a point adjacent the die block so that the stripper 87 may swing from the full-line position shown in FIG. 9 to the dotted-line position where it is opposite the opening in the die 14. A gripper finger 90 is pivoted at 91 to the stripper 87 and the end of this finger is provided with a projection 92 which cooperates with a recess 93 to grip the blank. This gripping finger is urged in a counterclockwise direction about its pivot by a spring 94 mounted in the stripper member 87.

To the end of the lever 88 is pivoted a rod 95 (FIG. 1) connected by a bell-crank lever 96 pivoted on the frame to one end of a link 97, the other end of which is pivoted to one end of a lever 98 and the other end of this lever is pivoted to the supporting frame at 99. The lever 98 is provided with a cam follower roller 100 which is maintained in contact with a stripper cam 101 eccentrically mounted on the shaft 63 by a spring 102, one end of which is secured to the lever 98 and the other secured to the frame.

It will be seen, therefore, that with this construction the stripper 87 is swung about its pivot 89 once every two revolutions of the shaft 47 corresponding to two reciprocations of the gate 45. As shown in FIG. 6, the piercing pin 67 has been propelled forwardly by the plunger 78 and lever 70 (FIG. 2), and the workpiece 53ᵇ has been ejected from the die which is after it has been headed. The stripper 87 has been swung to its dotted-line position in FIG. 9 where it is opposite the work piece and has gripped the latter between the projection 92 and walls of the recess 93.

At this time the plunger 78 is withdrawn toward the right, as shown in the drawings, which permits the plunger 76 to return the lever 70 to the position shown in FIG. 2 where its nose 73 abuts the end of the stop screw 54. The piercing pin is thereupon withdrawn toward the left or inwardly with respect to the die 14 by the lever 105 (FIG. 1) pivoted at 106 to the frame. The lower end of this lever engages in a recess 107 in the rod 68. The upper end of the lever 105 is engaged by a plunger 108 urged toward the right, as shown in FIG. 1, by the spring 109 so that this spring furnishes the actuating force for withdrawing the piercing pin toward the left from its position shown in FIG. 6 and effects the stripping of the work from this pin. The work is carried away from the die by the swinging of the stripper member 87 from the dotted-line to the full-line position of FIG. 9 where it may be disposed of in the usual manner.

The wire or rod stock is fed to the machine through the stube 110 to the face of the block, as shown in FIG. 2, where it may engage the work stop 111 which may be adjusted in the usual manner to determine the length of the workpiece. The workpiece is then cut off by the severing member 112 and transferred by this member to a position in front of the opening 15 of the die 14.

The manner in which the position of the die is controlled by the member 27 has previously been described This member is moved from one position to the other, that is to say, from the position shown in FIG. 2 to the position shown in FIG. 3 and vice versa, by means of an adjustable rod 113 (FIG. 1) pivoted at one end to the member 27 at 114. The other end of this rod is pivoted to one end of a bell-crank lever 115 pivoted at 116 to a bracket 117 on the frame and to the other end of this bell-crank lever is pivoted one end of a link 118, the other end of which is pivoted at 119 to the lever 57 which as previously described is rocked in both directions about its pivot 58 by the cam disk 62 and follower rollers 61. Therefore, the control member 27 for holding the die in its forward position shown in FIG. 4 or to permit it to be retracted to its rearward position shown in FIG. 5 will be shifted to the latter position once upon every alternate reciprocation of the gate. The movement of this member to the position shown in FIG. 2, holding the die in its forward position, will take place upon the withdrawal of the gate after the completion of the second operation upon the work shown in FIG. 5.

Referring once again to FIG. 9, the supporting structure 10 is preferably provided with a bracket 120 which is secured to the supporting structure 10, for example, by bolts 121. The bracket 120 is provided with an opening 122 through which a conduit 123 passes, which conduit is supporting in place so that an orifice 124 at the end of the conduit is in alignment with the work when the stripper member swings to the full-line position. A continuous stream of air from a suitable source (not shown) flows from the orifice 124 thus blowing the work from the recess 93, at about the time that the gripper finger 90 abuts against an adjustable stop member 125, which urges the gripping finger 90 in a clockwise direction. The work is preferably blown into a delivery chute which leads to a tote pan, which devices are not shown.

While the operation of the apparatus and the method of making a tubular rivet will be clear from the foregoing description, it may now be briefly described. A workpiece is cut off from a length of stock by the severing member 112 and transferred to a position in front of the die. The parts of the apparatus are in the position shown in FIG. 2 and the punch 51, as shown in FIG. 1, is opposite the die opening. Upon advance of the gate the punch 51 strikes the work and forces it into the opening 15 of the die 14, as shown in FIG. 4, slightly indenting the inner end of the workpiece against the forward end of the punch 67 and also coning the projecting end of the workpiece as shown at 53ᶜ. At this time the die is held positively in its forward position by the members 27 and 32 and the piercing punch held in the position shown in FIG. 4 by engagement of the nose 73 of the lever 70 with the stop screw 74.

The gate is now retracted and the punch carrier 50 is shifted upon the gate to bring the punch 52 into registration with the die opening. At this time the control member 27 is moved to the position shown in FIG. 3 wherein the projections 33 register with the recesses 31 of the member 27 so as to permit rearward movement of the die in the die block against the action of the springs 39. The shifting of the punch carrier and also the shifting of the control member 27 are both effected by movement of the lever 57 actuated by the cam 62 as previously described.

Upon th second advance of the gate the punch 52 engages the work, moving the die 14 rearwardly from the position shown in FIG. 4 to the position shown in FIG. 5 against the action of the springs 39. This causes the metal of the workpiece to be extruded around the end of the piercing pin to form a hollow body, the die coming to rest against the flange 18, as shown in FIG 5. As the die can move farther, the punch now perfects the head on the blank, as shown at 53ª in FIG. 5. During this extrusion operation the pin 67 is held against rearward movement by engagement of the member 69 against the nose 72 of the lever 70.

When the gate is again withdrawn, the link 82 is moved toward the left, as shown in FIG. 2, to advance the plug 69 and rod 68, moving the piercing pin to the position shown in FIG. 6 to eject the work from the die where it is received and carried away by the stripper 87 as previously described. It is understood that the die is returned from the position shown in FIG. 5 to that shown in FIG. 6 by the springs 39 and at the proper time the control member 27 is moved to the position shown in FIG. 2 to hold the die in its forward position. It may be noted that the die is positively held in its forward position, shown in FIG. 4, by the cooperating members 27 and 32 so that the head 53ᶜ will be properly coned to prepare for the final heading operation when the die again bottoms against the flange 18, as shown in FIG. 5.

After the work has been engaged by the stripper member 87 and stripper finger 90, the piercing pin 67 is withdrawn within the die by the lever 105 (FIG. 1) actuated by the spring-pressed plunger 108.

While we have shown and described a preferred embodiment of the apparatus for carrying out our improved process, it is understood that it is not to be limited to all of the details shown, but is capable of modification and variation within the spirit of the invention and within the spirit of the invention and within the scope of the claims.

What we claim is:

1. A double-blow header for making tubular articles comprising a supporting frame, a gate slidably mounted on the frame and carrying a plurality of punches, said gate arranged to sequentially position said punches in operative relation to a die carried by the frame upon which said punches sequentially advance, said die being mounted in said frame for rearward movement in the direction of travel of the punches upon impact thereon, means connected to said gate and actuated in timed relation with the movement of said gate for blocking said die against movement in said frame during the advance of one of said punches thereon and thereafter releasing said die and permitting rearward movement of said die in said frame upon advance of the second of said punches thereon, spring means for returning said die to its forward position upon retraction of said second punch from the die, and a piercing pin positioned within said die, said pin remaining stationary during the advance of said first and second punches toward said die.

2. A double-blow header for making hollow rivets comprising a suporting frame, a gate slidably mounted on the frame and carrying a plurality of punches, said gate arranged to sequentially position said punches in operative relation to a die carried by the frame upon which said punches sequentially advance, said die being mounted in said frame for rearward movement in the direction of travel of the punches, means connected to said gate and actuated in timed relation with the movement of said gate in positioning one of said punches, for blocking said die against movement in said frame during the advance of said one of said punches thereon, and thereafter releasing said die and permitting rearward movement of said die during advance of another of said punches thereon, a piercing pin within said die, and means for adjusting the position of said pin, said means for adjusting the position of said pin including means for holding said pin stationary during the advance of said punches.

3. A double-blow header for making hollow rivets comprising a supporting frame, a gate slidably mounted on the frame and carrying a plurality of punches, said gate arranged to sequentially position said punches in operative relation to a die carried by the frame upon which said punches sequentially advance, said die being mounted for rearward movement in the direction of travel of the punches, means connected to said gate and actuated in timed relation with the movement of said gate in positioning one of said punches, for blocking said die against movement in said frame during the advance of said one of said punches thereon and thereafter releasing said die and permitting rearward movement of said die during advance of another of said punches thereon, a piercing pin in said die, means for holding said piercing pin against movement during advance of said punches and thereafter advancing said pin to expel work from the die.

4. A double-blow header for making hollow rivets comprising a supporting frame, a gate slidably mounted on the frame and carrying a plurality of punches, said gate arranged to sequentially position said punches in operative relation to a die carried by the frame upon which said punches sequentially advance, said die being mounted in said frame for rearward movement in the direction of travel of the punches, means actuated in timed relation with the movement of the gate in positioning one of said punches, for blocking said die against movement during the advance of said one of said punches thereon, said die block means comprising a controlling member rotatably mounted in the frame to move from a position in which it blocks said die against movement to a position permitting rearward movement of said die upon impact of a punch thereon, and means connecting the gate to said controlling member to move said controlling member from one of said positions to the other of said positions in timed relation with movement of said gate to position said punches.

5. A double-blow header for making hollow rivets comprising a supporting frame, a gate slidably mounted on the frame and carrying a coning punch and a heading punch, said gate arranged to sequentially position said punches in operative relation to a die movably mounted on the frame upon which said punches sequentially advance, a piercing pin in the die, means for advancing the gate and moving the punches thereon to cause each punch to register with the die, means connected to said gate and actuated in timed relation with movement of said gate for blocking said die against movement in said frame during advance of the coning punch and releasing said blocking means during advance of the heading punch to allow movement of said die upon impact of said heading punch thereon, and means for holding said piercing pin against movement during advance of both punches.

6. A double-blow header for making hollow rivets comprising a supporting frame, a gate slidably mounted on the frame and carrying a coning punch and a heading punch, said gate arranged to sequentially position said punches in operative relation to a die movably mounted on the frame upon which said punches sequentially advance, a piercing pin in the die, means for advancing the gate and moving the punches thereon to cause said punches to alternately register with the die, means for blocking said die against movement in said frame during advance of the coning punch thereon and releasing said die during advance of the heading punch thereon, means for holding said piercing pin against movement during advance of both punches, means for advancing said piercing pin after retraction of the heading punch to eject the work from the die, and linkage means connecting said means for blocking and said gate to actuate said means for blocking in timed relation with movement of said gate to block and release said die.

7. A double-blow header comprising a supporting frame member; a die holder mounted on said frame member, a die in said die holder arranged to have longitudinal movement therein; a gate member slidably mounted on said frame member and carrying first and second punches, said gate member being arranged to sequentially position said punches in operative relation to said die and advance said punches on said die to form a workpiece held within the die; means aligned with said die and carried by said frame for backing up and holding said die in said die holder in a first position in response to positioning of a first of said punches to advance on said die, said aligned means being movable to a non-backing-up position in response to positioning of the second of said punches to advance on said die whereby when said second punch advances on said die, so that said die is permitted to move in said die holder in the direction of movement of said second punch thereon, linkage means connecting said gate and said aligned means to position said aligned means in timed relation with movement of said gate, means for extruding positioned within said die, and means for holding said last means in a fixed position during the advances of said first and second punches on said die.

8. A process for making tubular articles and the like, comprising:
 (A) inserting a portion of a workpiece within a bore of an axially movable die by advance of a first forming member, the position of said workpiece within the die being determined by a stationary pin within the bore of the die, the free end of said workpiece extending above the face of the die,
 (B) holding the die against axial movement,
 (C) upsetting the free end of the workpiece by continued movement of the first forming member to form a headed portion at the face of the die thereby preventing substantial axial movement of said workpiece relative to the die and stationary pin,
 (D) releasing the die for free axial movement, and
 (E) advancing a second forming member into contact with the headed end of the workpiece to advance the die in an axial direction and to advance the workpiece over the stationary pin to extrude at least the lower end of the confined portion of the workpiece within the die.

9. A double-blow header comprising a supporting frame member; a die holder mounted on said frame member, a die in said die holder arranged to have longitudinal movement therein; a gate member slidably mounted on said frame member and carrying first and second punches, said gate member being arranged to sequentially position said punches in operative relation to said die and advance said punches on said die to form a workpiece held within the die; means aligned with said die and carried by said frame for backing up and holding said die in said die holder in a first position in response to positioning of a first of said punches to advance on said die, said aligned means in response to positioning of the second of said punches to advance on said die being movable to a non-backing-up position, said aligned means comprising a control member rotatable between two operating positions and a sleeve intermediate said control member and said die, said control member in one of said positions being effective to positively hold said sleeve against said die to prevent movement of said die and in the other of said positions to release said sleeve for longitudinal movement and allow movement of said die in said die holder in the direction of movement of said second punch thereon, linkage means connecting said gate and said aligned means to position said aligned means in timed relation with movement of said gate, and said control member and said sleeve are elongated members of generally cylindrical configuration aligned with said die and said control member has projections on the end thereof opposite said sleeve adapted to either contact or be received within a backing member to thereby block or allow longitudinal movement of said control member dependent on the rotative position of said control member.

10. A double-blow header for making tubular articles comprising a supporting frame, a gate slidably mounted on the frame and carrying a plurality of punches, said gate arranged to sequentially position said punches in operative relation to a die carried by the frame upon which said punches sequentially advance, said die being mounted in said frame for rearward movement against resilient biasing means and in the direction of travel of the punches upon impact thereon, means connected to said gate and actuated in timed relation with the movement of said gate in positioning one of said punches, for blocking said die against movement in said frame during the advance thereon of one of said punches and a pin for extruding at least a portion of said stock upon advancement of the other of said punches.

11. A double-blow header for making tubular articles comprising a supporting frame, a gate slidably mounted on the frame and carrying a plurality of punches, said gate arranged to sequentially position said punches in operative relation to a die carried by the frame upon which said punches sequentially advance, said die being mounted in said frame for rearward movement against resilient biasing means and in the direction of travel of the punches, means connected to said gate and actuated in timed relation with the movement of said gate in positioning one of said punches, for blocking said die against movement in said frame in the advance thereon of one of said punches, thereafter releasing said die and permitting rearward movement of said die in said frame during advance of the second of said punches thereon and a pin for extruding at least a portion of said stock upon advancement of the second one of said punches.

12. A double-blow header for making hollow rivets comprising a supporting frame, a gate slidably mounted on the frame and carrying a plurality of punches, said gate arranged to sequentially position said punches in operative relation to a die carried by the frame upon which said punches sequentially advance, said die being mounted in said frame for rearward movement against resilient biasing means and in the direction of travel of the punches, means connected to said gate and actuated in timed relation with the movement of said gate in positioning one of said punches, for blocking said die against movement in said frame during the advance of one of said punches thereon, said die-blocking means comprising a sleeve slidably mounted in the frame, the forward end of which abuts the die and a controlling member actuated by the gate in positioning one of said punches to hold said sleeve against movement during advance of one of said punches on said die, and a pin for extruding at least a portion of said stock upon advancement of the other one of said punches.

13. A double-blow header comprising a supporting frame, a gate slidably mounted on the frame and carrying first and second punches, a die holder mounted in said frame having a die mounted therein, said die holder arranged to allow a predetermined rearward movement of said die therein against resilient biasing means and in the direction of travel of the punches thereon; control means operatively connected by linkage means to said gate, said linkage means being effective in response to said gate positioning, said first punch in operative relationship to said die to cause said control means to lock said die in a forward position in said die holder, said control means being responsive to movement of said linkage means caused by movement of said gate to position said second punch in an operative position with respect to said die to unlock said die whereby said die may move rearwardly in said die holder upon impact of said second punch and a pin for extruding at least a portion of said stock upon advancement of the second one of said punches.

14. A double-blow header comprising a supporting frame member, a die holder mounted on said frame, a die in said die holder arranged to have longitudinal movement therein; a gate member slidably mounted on said frame member and carrying first and second punches, said gate member being arranged to sequentially position said punches in operative relation to said die and advance said punches on said die to form a workpiece held within the die; means aligned with said die and carried by said frame for backing up and holding said die in said die holder in a first position in response to positioning of a first of said punches to advance on said die, said aligned means in response to positioning of the second of said punches to advance on said die being movable to a non-backing-up position, said aligned means comprising a control member rotatable between two operating positions and a sleeve intermediate said control member and said die, said control member in one of said positions being effective to positively hold said sleeve against said die to prevent movement of said die and in the other of said positions to release said sleeve for longitudinal movement and allow movement of said die in said die holder against resilient biasing means and in the direction of movement of said second punch thereon, means urging said control member toward said sleeve, linkage means for rotating said controlling member between said two positions in response to movement of said gate to position said punches, and a pin for extruding at least a portion of said workpiece upon advancement of the second one of said punches.

15. A double-blow header for making tubular articles and the like, comprising:
(A) a supporting frame,
(B) a gate slidably mounted on the frame and carrying a plurality of punches,
(C) a die carried by the frame upon which said punches sequentially advance,
  (i) said gate arranged to sequentially position said punches in operative relation to said die,
  (ii) said die being mounted in said frame for rearward movement against resilient biasing means in the direction of travel of the punches upon impact thereon,
(D) blocking means for blocking said die against movement in said frame during the advance of one of said punches,
  (i) said blocking means being operated in timed relation to the movement of said gate, and
(E) a pin for extruding at least a portion of said stock upon advancement of the other one of said punches.

16. A double-blow header for making tubular articles and the like, comprising:
(A) a supporting frame,
(B) a gate slidably mounted on said frame and carrying a plurality of punches,
(C) a die carried by the frame upon which said punches sequentially advance,
  (i) said gate arranged to sequentially position said punches in operative relation to said die,
  (ii) said die being mounted in said frame for rearward movement against resilient biasing means and in the direction of travel of the punches upon impact thereon,
(D) blocking means for blocking said die against movement in said frame during the advance of one of said punches,
  (i) said blocking means being operated in timed relation to the movement of said gate,
  (ii) the position of said blocking means being responsive to the position of said punches, and
(E) a pin for extruding at least a portion of said stock upon advancement of the other one of said punches.

References Cited by the Examiner

UNITED STATES PATENTS

| | | |
|---|---|---|
| 2,042,375 | 5/36 | Abel. |
| 2,112,284 | 3/38 | Gaess. |
| 2,114,420 | 4/38 | Freter. |
| 2,261,066 | 10/41 | Lovisek _____ 10—11 |
| 2,586,336 | 2/52 | Huck. |

ANDREW R. JUHASZ, *Primary Examiner.*

WILLIAM W. DYER, JR., *Examiner.*